United States Patent
Yoshida et al.

(10) Patent No.: US 10,982,085 B2
(45) Date of Patent: Apr. 20, 2021

(54) THERMOPLASTIC RESIN FILM AND GLASS PLATE-INCLUDING LAMINATE

(71) Applicant: SEKISUI CHEMICAL CO., LTD., Osaka (JP)

(72) Inventors: Shougo Yoshida, Kouka (JP); Atsushi Nohara, Kouka (JP); Kazuhiko Nakayama, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 284 days.

(21) Appl. No.: 16/088,014

(22) PCT Filed: Mar. 28, 2017

(86) PCT No.: PCT/JP2017/012516
§ 371 (c)(1),
(2) Date: Sep. 24, 2018

(87) PCT Pub. No.: WO2017/170472
PCT Pub. Date: Oct. 5, 2017

(65) Prior Publication Data
US 2020/0299497 A1    Sep. 24, 2020

(30) Foreign Application Priority Data

Mar. 28, 2016   (JP) .............................. JP2016-063908

(51) Int. Cl.
*C08L 31/04* (2006.01)
*B32B 17/10* (2006.01)
*C08K 5/13* (2006.01)

(52) U.S. Cl.
CPC ........ *C08L 31/04* (2013.01); *B32B 17/10036* (2013.01); *B32B 17/10761* (2013.01); *C08K 5/13* (2013.01); *B32B 2250/03* (2013.01); *B32B 2250/05* (2013.01); *B32B 2605/006* (2013.01); *B32B 2605/08* (2013.01); *B32B 2605/10* (2013.01); *B32B 2605/12* (2013.01); *B32B 2605/18* (2013.01); *C08L 2203/16* (2013.01)

(58) Field of Classification Search
CPC ........... C08L 31/04; C08K 5/09; C08K 5/098; C08K 5/13; B32B 17/10036; B32B 17/10761
See application file for complete search history.

(56) References Cited

U.S. PATENT DOCUMENTS

| | | | | |
|---|---|---|---|---|
| 5,321,076 A | * | 6/1994 | Fujii | .......................... C08F 8/14 524/503 |
| 5,728,472 A | | 3/1998 | D'Errico | |
| 6,268,415 B1 | * | 7/2001 | Renz | ................. B32B 17/10761 524/91 |
| 2012/0052310 A1 | | 3/2012 | Keller et al. | |
| 2013/0123399 A1 | | 5/2013 | Keller | |
| 2014/0110039 A1 | | 4/2014 | Lellig et al. | |
| 2015/0321453 A1 | | 11/2015 | Lellig et al. | |

FOREIGN PATENT DOCUMENTS

| | | |
|---|---|---|
| CN | 101007891 A | 8/2007 |
| CN | 102399402 A | 4/2012 |
| CN | 102892822 A | 1/2013 |
| CN | 105086307 A | 11/2015 |
| JP | 2001-32130 A | 2/2001 |
| JP | 2001-504429 A | 4/2001 |
| JP | 2001-240435 A | 9/2001 |
| JP | 2002-97041 A | 4/2002 |
| JP | 2007-70200 A | 3/2007 |
| JP | 2007-197604 A | 8/2007 |
| JP | 2012-46748 A | 3/2012 |
| JP | 2014-84461 A | 5/2014 |
| JP | 2015-108113 A | 6/2015 |
| WO | WO-2015/040663 A1 | 3/2015 |

OTHER PUBLICATIONS

JP 2015-108113 machine translation (Year: 2015).*
JP 2002-097041 (Year: 2002).*
Written Opinion of the International Searching Authority (PCT/ISA/237) for Application No. PCT/JP2017/012516 dated Jun. 27, 2017 (English Translation dated Oct. 11, 2018).
International Search Report for the Application No. PCT/JP2017/012516 dated Jun. 27, 2017.
Written Opinion of the International Searching Authority (PCT/ISA/237) for Application No. PCT/JP2017/012516 dated Jun. 27, 2017.
Supplementary European Search Report for the Application No. EP 17 775 009.8 dated Oct. 31, 2019.
The First Office Action for the Application No. 201780020118.2 from the State Intellectual Property Office of the People's Republic of China dated Aug. 4, 2020.

* cited by examiner

*Primary Examiner* — Edward J Cain
(74) *Attorney, Agent, or Firm* — Cheng Law Group, PLLC

(57) ABSTRACT

Provided is a thermoplastic resin film of which adhesive force can be easily adjusted to lie within an appropriate range when the thermoplastic resin film is bonded to other members such as a glass plate. A thermoplastic resin film according to the present invention includes a thermoplastic resin, and a compound represented by the following formula (1). In the formula (1), R1, R2, R3, R4 and R5 each represent a hydrogen atom, an alkyl group, a carboxyalkyl group, a group that is a salt of a carboxyalkyl group and alkali metal, or a group that is a salt of a carboxyalkyl group and alkaline earth metal, and at least one of R1, R2, R3, R4 and R5 represents a carboxyalkyl group, a group that is a salt of a carboxyalkyl group and alkali metal, or a group that is a salt of a carboxyalkyl group and alkaline earth metal.

13 Claims, 1 Drawing Sheet

[FIG. 1]
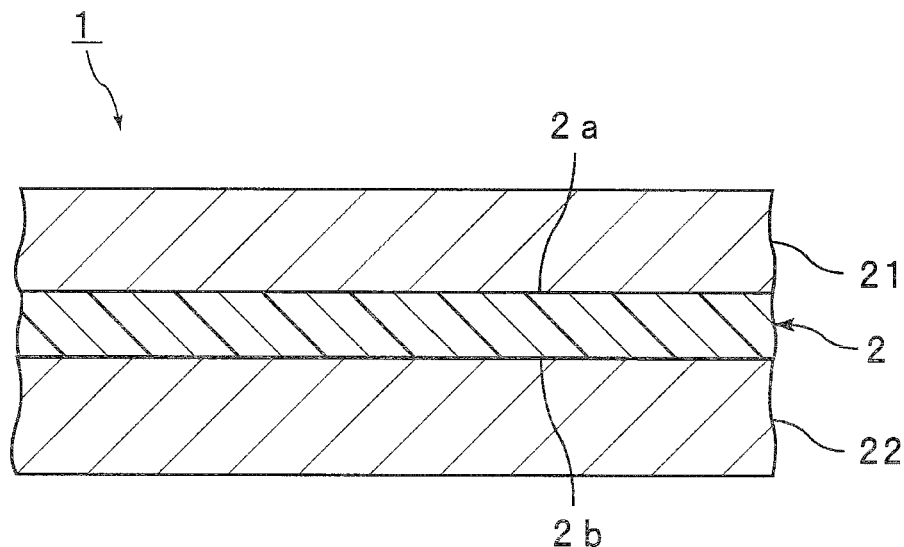
[FIG. 2]
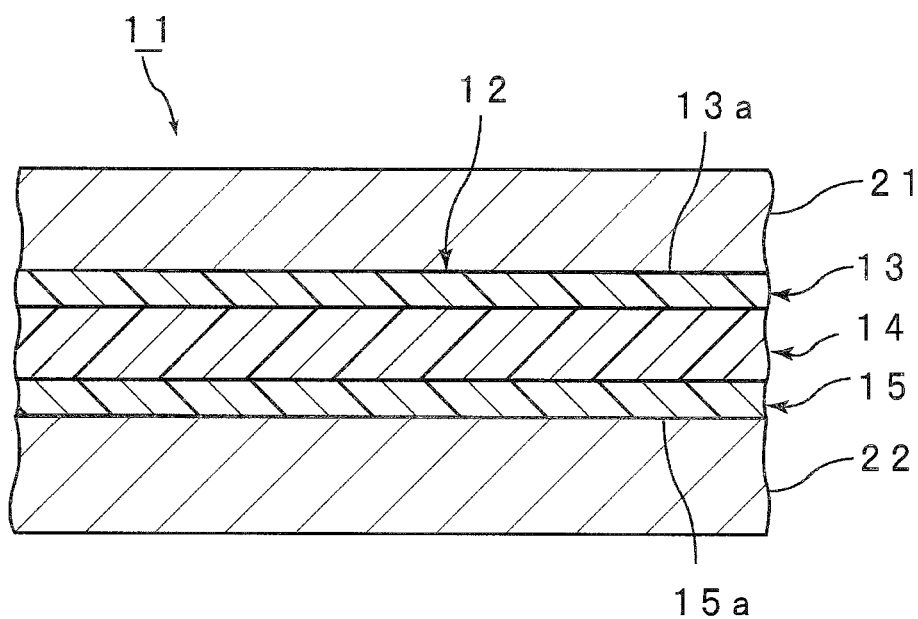

THERMOPLASTIC RESIN FILM AND GLASS PLATE-INCLUDING LAMINATE

TECHNICAL FIELD

The present invention relates to a thermoplastic resin film that is favorably used while it is bonded to other members such as a glass plate. Also, the present invention relates to a glass plate-including laminate prepared with the thermoplastic resin film.

BACKGROUND ART

A glass plate-including laminate in which a resin film is bonded to a glass plate is known. Among glass plate-including laminates, laminated glass is broadly used.

Since laminated glass generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is produced by sandwiching a thermoplastic resin film between a pair of glass plates. Besides the laminated glass, the thermoplastic resin film is sometimes used while it is bonded to a member other than a glass plate.

The thermoplastic resin film used for the laminated glass is disclosed, for example, in the following Patent Document 1.

The following Patent Document 1 discloses a sound insulating layer (thermoplastic resin film) including 100 parts by weight of a polyvinyl acetal resin with an acetalization degree of 60 to 85% by mole, 0.001 to 1.0 part by weight of at least one kind of metal salt among an alkali metal salt and an alkaline earth metal salt, and 30 parts by weight or more of a plasticizer. The sound insulating layer can be used as a monolayer interlayer film, or can be laminated with other layers to be used as a multilayer interlayer film.

RELATED ART DOCUMENT

Patent Document

Patent Document 1: JP 2007-070200 A

SUMMARY OF THE INVENTION

Problems to be Solved by the Invention

In a conventional thermoplastic resin film as described in Patent Document 1, the adhesive force to a glass plate or the like is sometimes too high. For example, if the adhesive force is too high in laminated glass in which the thermoplastic resin film is bonded to a glass plate, the laminated glass does not break in a cobweb-like manner, but tends to break as if it were torn. The laminated glass breaking as if it were torn rather than breaking in a cobweb-like manner has higher possibility of greatly wounding a human or the like by fragments of the glass. The laminated glass breaking in a cobweb-like manner rather than breaking as if it were torn further lowers the possibility of greatly wounding a human or the like by fragments of the glass, and further enhances the safety of the laminated glass.

It is an object of the present invention to provide a thermoplastic resin film of which adhesive force can be easily adjusted to lie within an appropriate range when the thermoplastic resin film is bonded to other members such as a glass plate. It is also an object of the present invention to provide a glass plate-including laminate prepared with the thermoplastic resin film.

Means for Solving the Problems

According to a broad aspect of the present invention, there is provided a thermoplastic resin film including a thermoplastic resin; and a compound represented by a formula (1) below:

[Chemical 1]

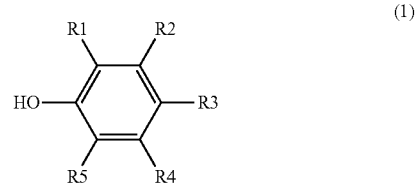

In the formula (1), R1, R2, R3, R4 and R5 each represent a hydrogen atom, an alkyl group, a carboxyalkyl group, a group that is a salt of a carboxyalkyl group and alkali metal, or a group that is a salt of a carboxyalkyl group and alkaline earth metal, and at least one of R1, R2, R3, R4 and R5 represents a carboxyalkyl group, a group that is a salt of a carboxyalkyl group and alkali metal, or a group that is a salt of a carboxyalkyl group and alkaline earth metal.

In a specific aspect of the thermoplastic resin film according to the present invention, the compound represented by the formula (1) includes a compound having a group that is a salt of a carboxyalkyl group and alkali metal, or a group that is a salt of a carboxyalkyl group and alkaline earth metal.

In a specific aspect of the thermoplastic resin film according to the present invention, R1, R2, R4 and R5 each represent a hydrogen atom or an alkyl group, and R3 represents a carboxyalkyl group, a group that is a salt of a carboxyalkyl group and alkali metal, or a group that is a salt of a carboxyalkyl group and alkaline earth metal.

In a specific aspect of the thermoplastic resin film according to the present invention, the compound represented by the formula (1) includes a compound represented by a formula (1A) below:

[Chemical 2]

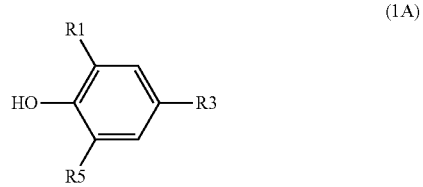

In the formula (1A), R1 and R5 each represent a hydrogen atom or an alkyl group, and R3 represents a carboxyalkyl group, a group that is a salt of a carboxyalkyl group and alkali metal, or a group that is a salt of a carboxyalkyl group and alkaline earth metal.

In a specific aspect of the thermoplastic resin film according to the present invention, R3 represents a carboxyalkyl group with 3 or less carbon atoms, a group that is a salt of a carboxyalkyl group with 3 or less carbon atoms and alkali metal, or a group that is a salt of a carboxyalkyl group with 3 or less carbon atoms and alkaline earth metal.

In a specific aspect of the thermoplastic resin film according to the present invention, the thermoplastic resin is a polyvinyl acetal resin.

In a specific aspect of the thermoplastic resin film according to the present invention, the thermoplastic resin film includes a plasticizer.

In a specific aspect of the thermoplastic resin film according to the present invention, the thermoplastic resin film includes K and Mg in a total amount of 250 ppm or less.

In a specific aspect of the thermoplastic resin film according to the present invention, the thermoplastic resin film includes a light stabilizer.

In a specific aspect of the thermoplastic resin film according to the present invention, the thermoplastic resin film includes an oxidation inhibitor.

In a specific aspect of the thermoplastic resin film according to the present invention, a content of the compound represented by the formula (1) in 100% by weight of the thermoplastic resin film is 0.001% by weight or more.

In a specific aspect of the thermoplastic resin film according to the present invention, the thermoplastic resin film is a thermoplastic resin film to be used while being bonded to a glass plate.

According to a broad aspect of the present invention, there is provided a glass plate-including laminate including a first glass plate; and a film including the above-described thermoplastic resin film, the thermoplastic resin film being bonded to the first glass plate.

In a specific aspect of the glass plate-including laminate according to the present invention, the glass plate-including laminate includes the first glass plate as a first lamination glass member; a film including the thermoplastic resin film; and a second lamination glass member, and the thermoplastic resin film is bonded to the first glass plate, the film including the thermoplastic resin film is bonded to the second lamination glass member, and the film including the thermoplastic resin film is arranged between the first glass plate and the second lamination glass member.

Effect of the Invention

Since the thermoplastic resin film according to the present invention includes a thermoplastic resin and a compound represented by the formula (1), it is possible to easily adjust the adhesive force of the thermoplastic resin film to lie within an appropriate range when the thermoplastic resin film is bonded to other member such as a glass plate.

BRIEF DESCRIPTION OF DRAWINGS

FIG. 1 is a sectional view showing a glass plate-including laminate prepared with a thermoplastic resin film according to one embodiment of the present invention.

FIG. 2 is a sectional view showing a modified example of a glass plate-including laminate prepared with the thermoplastic resin film according to one embodiment of the present invention.

MODE (S) FOR CARRYING OUT THE INVENTION

Hereinafter, the details of the present invention will be described.

The thermoplastic resin film according to the present invention (in the specification, also abbreviated as "resin film") is favorably used while it is bonded to other members such as a glass plate. The other member is an objective member to be bonded.

The resin film according to the present invention includes a thermoplastic resin and a compound represented by the formula (1).

In the present invention, since the above configuration is provided, it is possible to easily adjust the adhesive force to lie within an appropriate range when the thermoplastic resin film is bonded to other members such as a glass plate.

The resin film according to the present invention is favorably used while it is bonded to a glass plate, and is favorably used so as to obtain a glass plate-including laminate. In the present invention, it is possible to enhance the penetration resistance of the glass plate-including laminate. Further, even if the glass plate-including laminate breaks, the appearance of the broken glass plate-including laminate can be made good. For example, the glass plate-including laminate becomes more likely to break in a cobweb-like manner, and becomes less likely to break as if it were torn. Further, since the glass plate-including laminate breaks in a cobweb-like manner rather than breaking as if it were torn, the possibility of greatly wounding a human or the like by fragments of the glass further lowers, and the safety of the glass plate-including laminate is further enhanced.

Furthermore, since the above configuration is employed in the present invention, discoloration can also be suppressed. When the glass plate-including laminate has high transparency, high transparency can be kept over a long-term use or under exposure to high temperature, so that reduction in visible light transmittance can also be prevented.

Hereinafter, materials that can be used in the resin film according to the present invention are specifically described.

(Thermoplastic Resin)

The thermoplastic resin contained in the resin film is not particularly limited. As the thermoplastic resin, a conventionally known thermoplastic resin can be used. One kind of the thermoplastic resin may be used alone, and two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, an ionomer resin, a polyvinyl alcohol resin, and the like. Thermoplastic resins other than these may be used.

It is preferred that the thermoplastic resin be a polyvinyl acetal resin. By using a polyvinyl acetal resin and a plasticizer together, the adhesive force of the resin film according to the present invention for a glass plate, a lamination glass member, other resin films or the like is further enhanced.

For example, the polyvinyl acetal resin can be produced by acetalizing polyvinyl alcohol (PVA) with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally lies within the range of 70 to 99.9% by mole.

The average polymerization degree of the polyvinyl alcohol (PVA) is preferably 200 or more, more preferably 500 or more, even more preferably 1500 or more, further preferably 1600 or more, especially preferably 2600 or more, and most preferably 2700 or more and is preferably 5000 or less, more preferably 4000 or less, and further preferably 3500 or less. When the average polymerization degree is the above lower limit or more, the penetration resistance of laminated glass is further enhanced. When the average polymerization degree is the above upper limit or less, formation of a resin film is facilitated.

The average polymerization degree of the polyvinyl alcohol (PVA) may be 3000 or less, or may be 2500 or less.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin lie within the range of 3 to 5, and it is more preferred that the number of carbon atoms of the acetal group be 3 or 4. When the number of carbon atoms of the acetal group in the polyvinyl acetal resin is 3 or more, the glass transition temperature of the resin film is sufficiently lowered.

The aldehyde is not particularly limited. In general, an aldehyde with 1 to 10 carbon atoms is preferably used. Examples of the aldehyde with 1 to 10 carbon atoms include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. Propionaldehyde, n-butyraldehyde, isobutyraldehyde, n-hexylaldehyde, or n-valeraldehyde is preferred, propionaldehyde, n-butyraldehyde, or isobutyraldehyde is more preferred, and n-butyraldehyde is further preferred. One kind of the aldehyde may be used alone, and two or more kinds thereof may be used in combination.

The content of the hydroxyl group (the amount of hydroxyl groups) of the polyvinyl acetal resin is preferably 15% by mole or more, and more preferably 18% by mole or more and is preferably 40% by mole or less, and more preferably 35% by mole or less. When the content of the hydroxyl group is the above lower limit or more, the adhesive force of the resin film is further enhanced. Moreover, when the content of the hydroxyl group is the above upper limit or less, the flexibility of the resin film is enhanced and the handling of the resin film is facilitated.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be determined in accordance with JIS K6728 "Testing methods for polyvinyl butyral".

The acetylation degree (the amount of acetyl groups) of the polyvinyl acetal resin is preferably 0.1% by mole or more, more preferably 0.3% by mole or more, and further preferably 0.5% by mole or more and preferably 30% by mole or less, more preferably 25% by mole or less, and further preferably 20% by mole or less. When the acetylation degree is the above lower limit or more, the compatibility between the polyvinyl acetal resin and a plasticizer is enhanced. When the acetylation degree is the above upper limit or less, with regard to the resin film and the glass plate-including laminate, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be determined in accordance with JIS K6728 "Testing methods for polyvinyl butyral".

The acetalization degree of the polyvinyl acetal resin (the butyralization degree in the case of a polyvinyl butyral resin) is preferably 60% by mole or more, and more preferably 63% by mole or more and is preferably 85% by mole or less, more preferably 75% by mole or less, and further preferably 70% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree is a mole fraction, represented in percentage, obtained by dividing a value obtained by subtracting the amount of ethylene groups to which the hydroxyl group is bonded and the amount of ethylene groups to which the acetyl group is bonded from the total amount of ethylene groups in the main chain by the total amount of ethylene groups in the main chain.

The acetalization degree can be calculated by a method in accordance with JIS K6728 "Testing methods for polyvinyl butyral" or a method in accordance with ASTM D1396-92.

In this connection, it is preferred that the content of the hydroxyl group (the amount of hydroxyl groups), the acetalization degree (the butyralization degree) and the acetylation degree be calculated from the results determined by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree be calculated from the results determined by a method in accordance with JIS K6728 "Testing methods for polyvinyl butyral".

(Compound Represented by Formula (1))

The resin film includes a compound represented by the following formula (1). In the compound represented by the formula (1), a carboxyalkyl group, a group that is a salt of a carboxyalkyl group and alkali metal, or a group that is a salt of a carboxyalkyl group and alkaline earth metal is bonded to a phenol skeleton. By using such a compound, it becomes easy to adjust the adhesive force, and it is possible to suppress the discoloration. This is attributable to the property that alkali metal and alkaline earth metal are easy to concentrate on the interface between the glass and the resin film due to the tendency of the compound of the formula (1) to gather on the interface between the glass and the resin film, and the tendency of the carboxyalkyl group, and alkali metal and alkaline earth metal to coordinate with each other.

[Chemical 3]

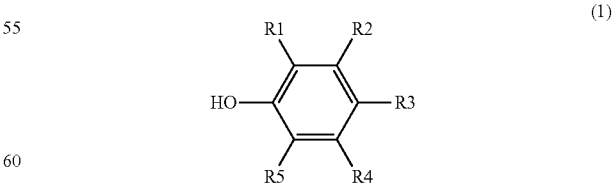

(1)

In the formula (1), R1, R2, R3, R4 and R5 each represent a hydrogen atom, an alkyl group, a carboxyalkyl group, a group that is a salt of a carboxyalkyl group and alkali metal, or a group that is a salt of a carboxyalkyl group and alkaline earth metal, and at least one of R1, R2, R3, R4 and R5 represents a carboxyalkyl group, a group that is a salt of a carboxyalkyl group and alkali metal, or a group that is a salt of a carboxyalkyl group and alkaline earth metal.

The carboxyalkyl group is a —R—COOH group (R is an alkylene group). The group that is a salt of a carboxyalkyl group and alkali metal, or the group that is a salt of a carboxyalkyl group and alkaline earth metal is a —R—COOX group (R is an alkylene group, X is alkali metal or alkaline earth metal). When X is K, the —R—COOX group is a —R—COOK group. When X is Mg, the —R—COOX group is a —R—COOMg group. For example, the —R—COOMg group shares Mg with other —R—COO group (—R—COOMgOOC—R—). Therefore, X can also be indicated by —R—COOMg$_{1/2}$ group. In the present specification, magnesium (Mg) is also classified in alkaline earth metal. In other words, alkaline earth metal referred in the present specification means Mg, Ca, Sr, and Ba.

The group that is a salt of a carboxyalkyl group and alkali metal, or the group that is a salt of a carboxyalkyl group and alkaline earth metal may be a group in which alkali metal is bonded to a carboxyalkyl group, or may be a group in which alkaline earth metal is bonded to a carboxyalkyl group.

From the viewpoint of adjusting the adhesive force more easily, and further suppressing the discoloration, it is preferred that R1, R2, R4 and R5 each represent a hydrogen atom or an alkyl group. From the viewpoint of adjusting the adhesive force more easily, and further suppressing the discoloration, it is preferred that R3 represent a carboxyalkyl group, a group that is a salt of a carboxyalkyl group and alkali metal, or a group that is a salt of a carboxyalkyl group and alkaline earth metal. From the viewpoint of adjusting the adhesive force more easily, and further suppressing the discoloration, it is preferred that R1, R2, R4 and R5 each represent a hydrogen atom or an alkyl group, and R3 represent a carboxyalkyl group, a group that is a salt of a carboxyalkyl group and alkali metal, or a group that is a salt of a carboxyalkyl group and alkaline earth metal.

From the viewpoint of adjusting the adhesive force more easily, and further suppressing the discoloration, the compound represented by the formula (1) preferably include a compound represented by the following formula (1A), and preferably be a compound represented by the following formula (1A).

[Chemical 4]

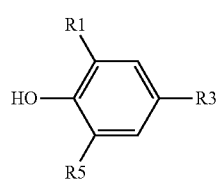

(1A)

In the formula (1A), R1 and R5 each represent a hydrogen atom or an alkyl group, and R3 represents a carboxyalkyl group, a group that is a salt of a carboxyalkyl group and alkali metal, or a group that is a salt of a carboxyalkyl group and alkaline earth metal.

From the viewpoint of adjusting the adhesive force more easily, and further suppressing the discoloration, it is preferred that R3 be a carboxyalkyl group with 3 or less carbon atoms, a group that is a salt of a carboxyalkyl group with 3 or less carbon atoms and alkali metal, or a group that is a salt of a carboxyalkyl group with 3 or less carbon atoms and alkaline earth metal. From the viewpoint of adjusting the adhesive force more easily, and further suppressing the discoloration, it is preferred that R3 represent a carboxyethyl group, a group that is a salt of a carboxyethyl group and alkali metal, or a group that is a salt of a carboxyethyl group and alkaline earth metal.

From the viewpoint of adjusting the adhesive force more easily, and further suppressing the discoloration, it is preferred that the carboxyalkyl group, the group that is a salt of a carboxyalkyl group and alkali metal, or the group that is a salt of a carboxyalkyl group and alkaline earth metal be a group that is a salt of a carboxyalkyl group and alkali metal, or a group that is a salt of a carboxyalkyl group and alkaline earth metal.

From the viewpoint of adjusting the adhesive force more easily, and further suppressing the discoloration, it is preferred that the compound represented by the formula (1) or the compound represented by the formula (1A) include a compound having a group that is a salt of a carboxyalkyl group and alkali metal, or a group that is a salt of a carboxyalkyl group and alkaline earth metal.

From the viewpoint of adjusting the adhesive force more easily, and further suppressing the discoloration, it is preferred that the alkali metal or the alkaline earth metal be K or Mg.

From the viewpoint of adjusting the adhesive force more easily, and further suppressing the discoloration, it is preferred that the alkyl group be an alkyl group with 4 or less carbon atoms. From the viewpoint of adjusting the adhesive force more easily, and further suppressing the discoloration, the compound represented by the formula (1) or the compound represented by the formula (1A) preferably have an alkyl group with 4 carbon atoms, and more preferably have a t-butyl group.

From the viewpoint of adjusting the adhesive force more easily, and further suppressing the discoloration, it is preferred that the compound represented by the formula (1) include a compound represented by the following formula (1AA), a compound represented by the following formula (1AB), or a compound represented by the following formula (1AC), and it is preferred that the compound represented by the formula (1) be a compound represented by the following formula (1AA), a compound represented by the following formula (1AB), or a compound represented by the following formula (1AC).

[Chemical 5]

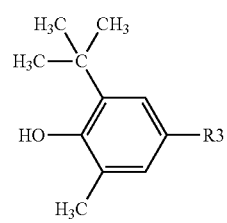

(1AA)

In the formula (1AA), R3 represents a carboxyalkyl group, a group that is a salt of a carboxyalkyl group and alkali metal, or a group that is a salt of a carboxyalkyl group and alkaline earth metal.

[Chemical 6]

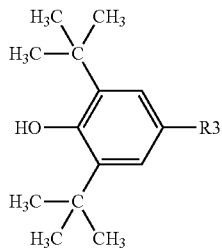

(1AB)

In the formula (1AB), R3 represents a carboxyalkyl group, a group that is a salt of a carboxyalkyl group and alkali metal, or a group that is a salt of a carboxyalkyl group and alkaline earth metal.

[Chemical 7]

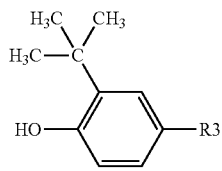

(1AC)

In the formula (1AC), R3 represents a carboxyalkyl group, a group that is a salt of a carboxyalkyl group and alkali metal, or a group that is a salt of a carboxyalkyl group and alkaline earth metal.

From the viewpoint of adjusting the adhesive force more easily, and further suppressing the discoloration, it is preferred that the compound represented by the formula (1) include a compound represented by the following formula (1AAA), a compound represented by the following formula (1ABA), or a compound represented by the following formula (1ACA), and it is preferred that the compound represented by the formula (1) be a compound represented by the following formula (1AAA), a compound represented by the following formula (1ABA), or a compound represented by the following formula (1ACA).

[Chemical 8]

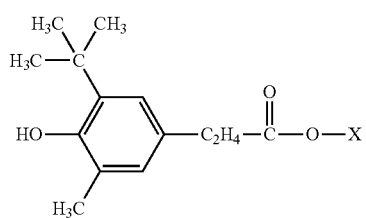

(1AAA)

[Chemical 9]

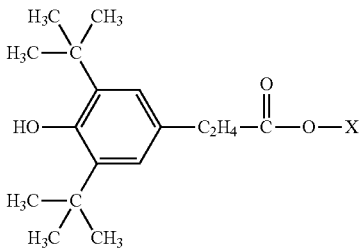

(1ABA)

[Chemical 10]

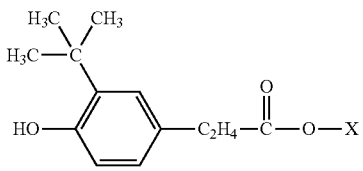

(1ACA)

X in the above formula (1AAA), formula (1ABA), formula (1ACA) represents a hydrogen atom, alkali metal or alkaline earth metal, and preferably represents alkali metal or alkaline earth metal.

From the viewpoint of adjusting the adhesive force more easily, and further suppressing the discoloration, a content of the compound represented by the formula (1) in 100% by weight of the thermoplastic resin film is preferably 0.001% by weight or more, and more preferably 0.025% by weight or more and is preferably 0.1% by weight or less, and more preferably 0.05% by weight or less.

(Plasticizer)

From the viewpoint of appropriately enhancing the adhesive force of a resin film, it is preferred that the resin film contain a plasticizer. It is especially preferred that a resin film contain a plasticizer when the thermoplastic resin contained in the resin film is a polyvinyl acetal resin.

The plasticizer is not particularly limited. As the plasticizer, a conventionally known plasticizer can be used. One kind of the plasticizer may be used alone, and two or more kinds thereof may be used in combination.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Organic ester plasticizers are preferred. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decanoic acid, and the like.

Examples of the polybasic organic acid ester include an ester compound of a polybasic organic acid and an alcohol having a linear or branched structure of 4 to 8 carbon atoms. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (11).

[Chemical 11]

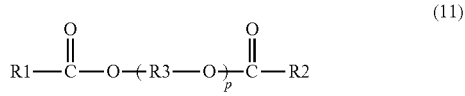

(11)

In the foregoing formula (11), R1 and R2 each represent an organic group with 5 to 10 carbon atoms, R3 represents an ethylene group, an isopropylene group or a n-propylene group, and p represents an integer of 3 to 10. It is preferred that R1 and R2 in the foregoing formula (11) each be an organic group with 6 to 10 carbon atoms.

It is preferred that the plasticizer include triethylene glycol di-2-ethylhexanoate (3GO) or triethylene glycol di-2-ethylbutyrate (3GH), and it is more preferred that the plasticizer include triethylene glycol di-2-ethylhexanoate.

The content of the plasticizer is not particularly limited. The content of the plasticizer relative to 100 parts by weight of the thermoplastic resin is preferably 25 parts by weight or more, and more preferably 30 parts by weight or more and is preferably 60 parts by weight or less, more preferably 50 parts by weight or less, further preferably 45 parts by weight or less, and further preferably 40 parts by weight or less. When the content of the plasticizer is the above lower limit or more, the penetration resistance of laminated glass is further enhanced. When the content of the plasticizer is the above upper limit or less, the transparency of the resin film is further enhanced.

From the viewpoint of further suppressing the damage of the glass plate-including laminate, it is preferred that the plasticizer contain triethylene glycol di-2-ethylhexanoate, and the content of triethylene glycol di-2-ethylhexanoate relative to 100 parts by weight of the thermoplastic resin is 20 parts by weight or more and 40 parts by weight or less.

(Metal Salt)

It is preferred that the resin film contain an alkali metal salt or an alkaline earth metal salt (hereinafter, these are collectively sometimes described as Metal salt M) besides the compound represented by the formula (1). By using the metal salt M, control of the adhesive force of the resin film according to the present invention for a glass plate, a lamination glass member or other resin film is further facilitated. One kind of the Metal salt M may be used alone, and two or more kinds thereof may be used in combination.

It is preferred that the Metal salt M contain as metal Li, Na, K, Rb, Cs, Mg, Ca, Sr or Ba. It is preferred that the metal salt included in the resin film be K or Mg. In this case, both K and Mg may be contained.

Moreover, it is more preferred that the Metal salt M be an alkali metal salt of an organic acid with 2 to 16 carbon atoms or an alkaline earth metal salt of an organic acid with 2 to 16 carbon atoms, and it is further preferred that the Metal salt M be a potassium carboxylate with 2 to 16 carbon atoms or a magnesium carboxylate with 2 to 16 carbon atoms.

Although the magnesium carboxylate with 2 to 16 carbon atoms and the potassium carboxylate with 2 to 16 carbon atoms are not particularly limited, examples thereof include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in the resin film is preferably 5 ppm or more, more preferably 10 ppm or more, and further preferably 20 ppm or more and preferably 300 ppm or less, more preferably 250 ppm or less, and further preferably 200 ppm or less. When the total of the contents of Mg and K is the above lower limit or more and the above upper limit or less, it is possible to control the adhesive force of the resin film for a glass plate, a lamination glass member or other resin film or the like more favorably. The total of the contents of Mg and K in the resin film includes Mg and K derived from the compound represented by the formula (1).

(Ultraviolet Ray Screening Agent)

It is preferred that the resin film include an ultraviolet ray screening agent. By using the ultraviolet ray screening agent, discoloration is further suppressed and the visible light transmittance is less likely to lower even when the resin film is used over a long term or used under high temperature. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include a metal-based ultraviolet ray screening agent (an ultraviolet ray screening agent containing a metal), a metal oxide-based ultraviolet ray screening agent (an ultraviolet ray screening agent containing a metal oxide), a benzotriazole-based ultraviolet ray screening agent (an ultraviolet ray screening agent having a benzotriazole structure), a benzophenone-based ultraviolet ray screening agent (an ultraviolet ray screening agent having a benzophenone structure), a triazine-based ultraviolet ray screening agent (an ultraviolet ray screening agent having a triazine structure), a malonic acid ester-based ultraviolet ray screening agent (an ultraviolet ray screening agent having a malonic acid ester structure), an oxanilide-based ultraviolet ray screening agent (an ultraviolet ray screening agent having an oxanilide structure), a benzoate-based ultraviolet ray screening agent (an ultraviolet ray screening agent having a benzoate structure), and the like.

Examples of the metal-based ultraviolet ray screening agent include platinum particles, particles in which the surface of platinum particles is coated with silica, palladium particles, particles in which the surface of palladium particles is coated with silica, and the like. It is preferred that the ultraviolet ray screening agent not be heat shielding particles.

The ultraviolet ray screening agent is preferably a benzotriazole-based ultraviolet ray screening agent, a benzophenone-based ultraviolet ray screening agent, a triazine-based ultraviolet ray screening agent, or a benzoate-based ultraviolet ray screening agent, more preferably a benzotriazole-based ultraviolet ray screening agent or a benzophenone-based ultraviolet ray screening agent, and further preferably a benzotriazole-based ultraviolet ray screening agent.

Examples of the metal oxide-based ultraviolet ray screening agent include zinc oxide, titanium oxide, cerium oxide, and the like. Furthermore, with regard to the metal oxide-based ultraviolet ray screening agent, the surface thereof may be coated with any material. Examples of the coating material for the surface of the metal oxide-based ultraviolet ray screening agent include an insulating metal oxide, a hydrolyzable organosilicon compound, a silicone compound, and the like.

Examples of the insulating metal oxide include silica, alumina, zirconia, and the like. For example, the insulating metal oxide has a band-gap energy of 5.0 eV or more.

Examples of the benzotriazole-based ultraviolet ray screening agent include benzotriazole-based ultraviolet ray screening agents such as 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.) and 2-(2'-hydroxy-3',5'-di-amylphenyl)benzotriazole ("Tinuvin 328" available from BASF Japan Ltd.). It is preferred that the ultraviolet ray screening agent be a benzotriazole-based ultraviolet ray screening agent containing a halogen atom, and it is more preferred that the ultraviolet ray screening agent be a benzotriazole-based ultraviolet ray screening agent containing a chlorine atom, because those are excellent in ultraviolet ray absorbing performance.

Examples of the benzophenone-based ultraviolet ray screening agent include octabenzone ("Chimassorb 81" available from BASF Japan Ltd.), and the like.

Examples of the triazine-based ultraviolet ray screening agent include "LA-F70" available from ADEKA CORPORATION, 2-(4,6-diphenyl-1,3,5-triazin-2-yl)-5-[(hexyl)oxy]-phenol ("Tinuvin 1577FF" available from BASF Japan Ltd.), and the like.

Examples of the malonic acid ester-based ultraviolet ray screening agent include dimethyl 2-(p-methoxybenzylidene)malonate, tetraethyl-2,2-(1,4-phenylenedimethylidene)bis-malonate, 2-(p-methoxybenzylidene)-bis(1,2,2,6,6-pentamethyl-4-piperidinyl)malonate, and the like.

Examples of a commercial product of the malonic acid ester-based ultraviolet ray screening agent include Hostavin B-CAP, Hostavin PR-25, and Hostavin PR-31 (any of these is available from Clariant Japan K.K.).

Examples of the oxanilide-based ultraviolet ray screening agent include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxy-phenyl)oxalic acid diamide, and 2-ethyl-2'-ethoxy-oxanilide ("Sanduvor VSU" available from Clariant Japan K.K.).

Examples of the benzoate-based ultraviolet ray screening agent include 2,4-di-tert-butylphenyl-3,5-di-tert-butyl-4-hydroxybenzoate ("Tinuvin 120" available from BASF Japan Ltd.), and the like.

From the viewpoint of further suppressing the discoloration and further suppressing the lowering in visible light transmittance, in 100% by weight of the resin film, the content of the ultraviolet ray screening agent is preferably 0.1% by weight or more, more preferably 0.2% by weight or more, further preferably 0.3% by weight or more, and especially preferably 0.5% by weight or more and is preferably 2.5% by weight or less, more preferably 2% by weight or less, further preferably 1% by weight or less, and especially preferably 0.8% by weight or less.

(Oxidation Inhibitor)

It is preferred that the resin film include an oxidation inhibitor. By using the oxidation inhibitor, discoloration is further suppressed and the visible light transmittance is less likely to lower even when the resin film is used over a long term or used under high temperature. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid) ethylenebis(oxyethylene), and the like. One kind or two or more kinds among these oxidation inhibitors are preferably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, 2,2'-methylenebis(4,6-di-t-butyl-1-phenyloxy)(2-ethylhexyloxy)phosphorus, and the like. One kind or two or more kinds among these oxidation inhibitors are preferably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "H-BHT" available from Sakai Chemical Industry Co., Ltd., "IRGANOX 1010" available from BASF Japan Ltd., and the like.

From the viewpoint of further suppressing the discoloration and further suppressing the lowering in visible light transmittance, in 100% by weight of the resin film, the content of the oxidation inhibitor is preferably 0.025% by weight or more, more preferably 0.05% by weight or more, further preferably 0.1% by weight or more. Moreover, since an effect commensurate with the addition of an oxidation inhibitor is not attained, it is preferred that the content of the oxidation inhibitor be 2% by weight or less in 100% by weight of the resin film.

(Light Stabilizer)

It is preferred that the resin film include a light stabilizer. By using the light stabilizer, discoloration is further suppressed and the visible light transmittance is less likely to lower even when the resin film is used over a long term or exposed to sunlight. One kind of the light stabilizer may be used alone and two or more kinds thereof may be used in combination.

From the viewpoint of further suppressing the discoloration, it is preferred that the light stabilizer be a hindered amine light stabilizer.

Examples of the hindered amine light stabilizer include hindered amine light stabilizers in which an alkyl group, an alkoxy group or a hydrogen atom is bonded to a nitrogen atom of the piperidine structure. From the viewpoint of further suppressing the discoloration, a hindered amine light stabilizer in which an alkyl group or an alkoxy group is bonded to a nitrogen atom of the piperidine structure is preferred. The hindered amine light stabilizer is preferably a hindered amine light stabilizer in which an alkyl group is bonded to a nitrogen atom of the piperidine structure, and also preferably a hindered amine light stabilizer in which an alkoxy group is bonded to a nitrogen atom of the piperidine structure.

As the hindered amine light stabilizer in which an alkyl group is bonded to a nitrogen atom of the piperidine structure, "Tinuvin765" and "Tinuvin622SF" available from BASF, and "ADK STAB LA-52" available from ADEKA, or the like can be recited.

As the hindered amine light stabilizer in which an alkoxy group is bonded to a nitrogen atom of the piperidine structure, "TinuvinXT-850FF" and "TinuvinXT-855FF" available from BASF, and "ADK STAB LA-81" available from ADEKA, or the like can be recited.

As the hindered amine light stabilizer in which a hydrogen atom is bonded to a nitrogen atom of the piperidine structure, "Tinuvin770DF" available from BASF, and "Hostavin N24" available from Clariant, or the like can be recited.

From the viewpoint of further suppressing the discoloration, the light stabilizer has a molecular weight of preferably 2000 or less, more preferably 1000 or less, further preferably 700 or less.

In 100% by weight of the resin film, the content of the light stabilizer is preferably 0.0025% by weight or more, and more preferably 0.025% by weight or more and is preferably 0.5% by weight or less, and more preferably 0.3% by weight or less. When the content of the light stabilizer is the above lower limit or more and the above upper limit or less, discoloration is efficiently suppressed.

(Other Ingredients)

The resin film may contain additives such as a flame retardant, an antistatic agent, a pigment, a dye, a moisture-resistance improving agent, a fluorescent brightening agent, and an infrared ray absorber, as necessary. One kind of these additives may be used alone, and two or more kinds thereof may be used in combination.

(Other Details of Resin Film)

From the viewpoints of effectively enhancing the penetration resistance of laminated glass, the resin film has a glass transition temperature of preferably 10° C. or higher, more preferably 15° C. or higher, and further preferably 20° C. or higher and is preferably 45° C. or lower, more preferably 40° C. or lower, and further preferably 35° C. or lower.

The thickness of the resin film is not particularly limited. From the viewpoint of the practical aspect and the viewpoint of sufficiently enhancing the heat shielding property, the thickness of the resin film is preferably 0.1 mm or more, and more preferably 0.25 mm or more and is preferably 3 mm or less, and more preferably 1.5 mm or less. When the thickness of the resin film is the above lower limit or more, the penetration resistance of laminated glass is further enhanced. When the thickness of the resin film is the above upper limit or less, the transparency of the resin film is further improved.

The method for producing the resin film is not particularly limited. As the method for producing the resin film, a conventionally known method can be used. For example, a production method including kneading the ingredients, and molding the resin film can be recited. A production method of extrusion-molding is preferred because the method is suitable for continuous production.

A method for the kneading is not particularly limited. Examples of such a method include methods using an extruder, a plastograph, a kneader, a Banbury mixer or a calendar roll, or the like. A method of using an extruder is suitable, and a method of using a biaxial extruder is more suitable because such a method is suited for continuous production.

The resin film according to the present invention may be used solely for laminated glass, or may be used for laminated glass together with other resin film. The resin film according to the present invention can be used as a multilayer resin film while it is laminated on other resin film.

(Glass Plate-Including Laminate)

The glass plate-including laminate according to the present invention includes a first glass plate as a first lamination glass member, a film including the thermoplastic resin film, and a second lamination glass member. In the glass plate-including laminate according to the present invention, the thermoplastic resin film is bonded to the first glass plate. The film including the thermoplastic resin film is bonded to the first glass plate. In the glass plate-including laminate according to the present invention, the film including the thermoplastic resin film is bonded to the second lamination glass member. In the glass plate-including laminate according to the present invention, the thermoplastic resin film may be bonded to the second lamination glass member, or the thermoplastic resin film may be bonded to the second lamination glass member with other resin film interposed therebetween. In the glass plate-including laminate according to the present invention, a film including the thermoplastic resin film is arranged between the first glass plate and the second lamination glass member. In the glass plate-including laminate according to the present invention, a film including the thermoplastic resin film is sandwiched between the first glass plate and the second lamination glass member.

FIG. 1 is a sectional view showing one example of a glass plate-including laminate prepared with the thermoplastic resin film in accordance with one embodiment of the present invention.

A glass plate-including laminate 1 shown in FIG. 1 includes a resin film 2, a first lamination glass member 21 (first glass plate), and a second lamination glass member 22 (which may be a second glass plate). The resin film 2 is a monolayer resin film. The resin film 2 is used for obtaining a glass plate-including laminate. The resin film 2 is a resin film to be used while it is bonded to a glass plate. The glass plate-including laminate 1 is laminated glass.

The resin film 2 is arranged and sandwiched between the first lamination glass member 21 and the second lamination glass member 22. The first lamination glass member 21 is layered on a first surface 2a (one surface) of the resin film 2. The second lamination glass member 22 is layered on a second surface 2b (other surface) opposite to the first surface 2a of the resin film 2.

FIG. 2 is a sectional view showing a modified example of a glass plate-including laminate prepared with the thermoplastic resin film in accordance with one embodiment of the present invention.

A glass plate-including laminate 11 shown in FIG. 2 includes a resin film 12, the first lamination glass member 21 (first glass plate), and the second lamination glass member 22. The resin film 12 is a multilayer resin film. The resin film 12 is used for obtaining a glass plate-including laminate. The resin film 12 is a resin film to be used while it is bonded to a glass plate. The glass plate-including laminate 11 is laminated glass.

The resin film 12 has such a structure that three resin films: a first layer 13 (resin film), a second layer 14 (resin film) and a third layer 15 (resin film) are laminated in this order. In the present embodiment, the second layer 14 is a sound insulating layer. As the first layer 13 and the third layer 15, the resin film according to one embodiment of the present invention is used. The second layer 14 is bonded to the first and the second lamination glass members 21, 22 with the first and the third layers 13, 15 interposed therebetween. The first and the third layers 13, 15 are protective layers. As the first layer 13 and the third layer 15, the resin film according to one embodiment of the present invention is used. The second layer 14 may also be the resin film according to an embodiment of the present invention.

The resin film 12 is arranged and sandwiched between the first lamination glass member 21 and the second lamination glass member 22. The second layer 14 (resin film) is arranged between the first lamination glass member 21 and the second lamination glass member 22 with the first and the third layers 13, 15 interposed therebetween. The first lamination glass member 21 is layered on an outer surface 13a of the first layer 13. The second lamination glass member 22 is layered on an outer surface 15a of the third layer 15.

As described above, it suffices that the glass plate-including laminate according to the present invention includes a first glass plate, and a film including the thermoplastic resin film according to the present invention. It is preferred that the film including the thermoplastic resin film be arranged between the first lamination glass member (first glass plate) and the second lamination glass member. The glass plate-including laminate may include only the thermoplastic resin film according to the present invention, or may include the thermoplastic resin film according to the present invention and other resin film, as the film including the thermoplastic resin film. The glass plate-including laminate includes at least the thermoplastic resin film according to the present invention.

When the resin film according to the present invention is used as at least one layer in a multilayer film having two or more layers, it is preferred that the multilayer film be a sound insulating film having a sound insulating layer so as to improve the sound insulating property of the laminated glass. The multilayer film is a film including the resin film according to the present invention. The multilayer film may include a sound insulating layer and a protective layer. As the multilayer film, a two-layer structure of a sound insulating layer and a protective layer, a three-layer structure of a protective layer, a sound insulating layer, and a protective layer, and a four or more-layer structure having at least one sound insulating layer and at least one protective layer can be recited. In FIG. 2, a multilayer film made up of the first layer 13, the second layer 14, and the third layer 15 is shown. In this case, the resin film according to the present invention can be used as the first layer 13, and the resin film according to the present invention can be used also as the third layer 15. For example, the multilayer film may be made up of only the first layer 13 and the second layer 14 in FIG. 2. In this case, the resin film according to the present invention can be used as the first layer 13, and the resin film according to the present invention can be used also as the second layer 14.

In the case of the multilayer film having a two-layer structure made up of a sound insulating layer and a protective layer, the sound insulating layer may be the resin film according to the present invention, the protective layer may be the resin film according to the present invention, and it is preferred that the protective layer be the resin film according to the present invention. In the case of the multilayer film having a three-layer structure made up of a protective layer, a sound insulating layer, and a protective layer, the protective layer includes the resin film according to the present invention, and the sound insulating layer may be the resin film according to the present invention. It is preferred that the protective layer be the resin film according to the present invention. In the case of the multilayer film having a four or more-layer structure made up of at least one sound insulating layer, and at least one protective layer, the sound insulating layer may be the resin film according to the present invention, and the protective layer may be the resin film according to the present invention. It is preferred that the protective layer be the resin film according to the present invention.

In the multilayer film, the sound insulating layer imparts the sound insulating property in the multilayer film. It is preferred that the sound insulating layer contain a polyvinyl acetal resin (X) and a plasticizer.

For example, the polyvinyl acetal resin (X) can be produced by acetalizing polyvinyl alcohol (PVA) with an aldehyde. It is preferred that the polyvinyl acetal resin (X) be an acetalized product of polyvinyl alcohol. For example, the polyvinyl alcohol can be obtained by saponifying polyvinyl acetate. The saponification degree of the polyvinyl alcohol generally lies within the range of 70 to 99.9% by mole.

An average polymerization degree of the polyvinyl alcohol (PVA) used for production of the polyvinyl acetal resin (X) is preferably 200 or more and preferably 5000 or less, and more preferably 4000 or less. When the average polymerization degree is the above lower limit or more, the penetration resistance is further enhanced. When the average polymerization degree is the above upper limit or less, formation of a sound insulating layer is facilitated.

In production of the polyvinyl acetal resin (X), the number of carbon atoms in aldehyde for acetalizing the polyvinyl alcohol is preferably 4 or more, and is preferably 6 or less. When the number of carbon atoms in aldehyde is the above lower limit or more, it is possible to make a sufficient amount of a plasticizer be contained stably, and it is possible to exhibit excellent sound insulating property. Also, it is possible to prevent a plasticizer from bleeding out. When the number of carbon atoms in aldehyde is the above upper limit or less, synthesis of the polyvinyl acetal resin (X) is facilitated, and the productivity can be ensured.

The aldehyde with 4 to 6 carbon atoms may be a straight-chain aldehyde, or may be a branched aldehyde. Examples of the aldehyde with 4 to 6 carbon atoms include n-butyl aldehyde, and n-valeraldehyde.

The content of the hydroxyl group of the polyvinyl acetal resin (X) is preferably 30% by mole or less, more preferably 28% by mole or less, further preferably 26% by mole or less, and especially preferably 24% by mole or less. When the content of the hydroxyl group of the polyvinyl acetal resin (X) is the above upper limit or less, it is possible to make a plasticizer be contained in an amount necessary for exhibition of the sound insulating property, and it is possible to prevent the plasticizer from bleeding out. The content of the hydroxyl group of the polyvinyl acetal resin (X) is preferably 10% by mole or more, more preferably 15% by mole or more, and further preferably 20% by mole or more.

The acetalization degree of the polyvinyl acetal resin (X) is preferably 60% by mole or more, more preferably 65% by mole or more, and further preferably 68% by mole or more and is preferably 85% by mole or less. When the acetalization degree of the polyvinyl acetal resin (X) is the above lower limit or more, it is possible to increase the hydrophobicity of the sound insulating layer, and to make a plasticizer be contained in an amount necessary for exhibition of the sound insulating property, so that it is possible to prevent bleeding out of the plasticizer or whitening. When the acetalization degree of the polyvinyl acetal resin (X) is the above upper limit or less, synthesis of the polyvinyl acetal resin (X) is facilitated, and productivity can be ensured.

The acetylation degree of the polyvinyl acetal resin (X) is preferably 0.1% by mole or more, more preferably 1% by mole or more, further preferably 5% by mole or more, and especially preferably 8% by mole or more and is preferably 30% by mole or less, more preferably 25% by mole or less, and further preferably 20% by mole or less. When the acetylation degree of the polyvinyl acetal resin (X) is the above lower limit or more, it is possible to make a plasticizer be contained in an amount necessary for exhibition of the sound insulating property, and bleeding out can be prevented. When the acetylation degree of the polyvinyl acetal resin (X) is the above upper limit or less, it is possible to increase the hydrophobicity of the sound insulating layer, and it is possible to prevent whitening.

In particular, since it is possible to easily make a plasticizer in an amount necessary for exhibition of the sound insulating property be contained in the sound insulating layer, it is preferred that the polyvinyl acetal resin (X) be a polyvinyl acetal resin having an acetylation degree of 8% by mole or more, or a polyvinyl acetal resin having an acetylation degree of less than 8% by mole and an acetalization degree of 65% by mole or more. It is more preferred that the polyvinyl acetal resin (X) be a polyvinyl acetal resin having an acetylation degree of 8% by mole or more, or a polyvinyl acetal resin having an acetylation degree of less than 8% by mole and an acetalization degree of 68% by mole or more.

The content of the plasticizer in the sound insulating layer, relative to 100 parts by weight of the polyvinyl acetal resin (X) in the sound insulating layer is preferably 45 parts by weight or more, more preferably 50 parts by weight or more, and further preferably 55 parts by weight or more and is preferably 80 parts by weight or less, more preferably 75 parts by weight or less, and further preferably 70 parts by weight or less. When the content of the plasticizer is the above lower limit or more, high sound insulating property can be exhibited, and when the content of the plasticizer is the above upper limit or less, the plasticizer is less likely to bleed out, and deterioration in transparency and adhesivity of the multilayer film can be prevented.

The thickness of the sound insulating layer is preferably 50 μm or more, and more preferably 80 μm or more and is preferably 300 μm or less. When the thickness of the sound insulating layer is the above lower limit or more, sufficient sound insulating property can be exhibited. The thickness of the sound insulating layer shows an average thickness. A cross section shape in the thickness direction of the sound insulating layer may be a rectangular shape, and the sound insulating layer may have a wedge-shaped portion.

The sound insulating layer has one end, and other end on the opposite side of the one end, and may have such a shape that the thickness of the other end is larger than the thickness of the one end. It is preferred that the sound insulating layer have a portion having a wedge-shaped cross section in the thickness direction. In this case, the minimum thickness of the sound insulating layer is preferably 50 μm or more, more preferably 80 μm or more, and further preferably 100 μm or more. When the minimum thickness of the sound insulating layer is the above lower limit or more, sufficient sound insulating property can be exhibited. The upper limit of the maximum thickness of the sound insulating layer is not particularly limited. Taking the thickness as the multilayer film into account, the maximum thickness of the sound insulating layer is preferably 300 μm or less, and more preferably 200 μm or less.

The protective layer prevents a large amount of the plasticizer contained in the sound insulating layer from bleeding out to deteriorate the adhesivity between the multilayer film, and the glass plate and the lamination glass member, and imparts the penetration resistance to the multilayer film. It is preferred that the protective layer contain a polyvinyl acetal resin (Y) and a plasticizer.

For example, the polyvinyl acetal resin (Y) can be produced by acetalizing polyvinyl alcohol (PVA) with an aldehyde. It is preferred that the polyvinyl acetal resin (Y) be an acetalized product of polyvinyl alcohol. For example, the polyvinyl alcohol can be obtained by saponifying polyvinyl acetate. The saponification degree of the polyvinyl alcohol generally lies within the range of 70 to 99.9% by mole.

An average polymerization degree of the polyvinyl alcohol (PVA) used for production of the polyvinyl acetal resin (Y) is preferably 200 or more and preferably 5000 or less, and more preferably 4000 or less. When the average polymerization degree is the above lower limit or more, the penetration resistance of the glass plate-including laminate is further enhanced. When the average polymerization degree is the above upper limit or less, formation of the protective layer is facilitated.

In production of the polyvinyl acetal resin (Y), the number of carbon atoms in aldehyde for acetalizing the polyvinyl alcohol is preferably 3 or more and is preferably 4 or less. When the number of carbon atoms in aldehyde is the above lower limit or more, the penetration resistance of the multilayer film is enhanced. When the number of carbon atoms in aldehyde is the above upper limit or less, productivity of the polyvinyl acetal resin (Y) is improved.

The aldehyde with 3 to 4 carbon atoms may be a straight-chain aldehyde, or may be a branched aldehyde. Examples of the aldehyde with 3 to 4 carbon atoms include n-butyraldehyde.

The content of the hydroxyl group of the polyvinyl acetal resin (Y) is preferably 33% by mole or less, and is preferably 28% by mole or more. When the content of the hydroxyl group of the polyvinyl acetal resin (Y) is the above upper limit or less, it is possible to prevent whitening of the multilayer film. When the content of the hydroxyl group of the polyvinyl acetal resin (Y) is the above lower limit or more, the penetration resistance of the multilayer film is enhanced.

The acetalization degree of the polyvinyl acetal resin (Y) is preferably 60% by mole or more, and more preferably 65% by mole or more and is preferably 80% by mole or less, and more preferably 69% by mole or less. When the acetalization degree of the polyvinyl acetal resin (Y) is the above lower limit or more, it is possible to make a plasticizer be contained in an amount necessary for sufficient exhibition of the penetration resistance. When the acetalization degree of the polyvinyl acetal resin (Y) is the above upper limit or less, it is possible to ensure the adhesive force between the protective layer, and the glass plate and the lamination glass member.

The acetylation degree of the polyvinyl acetal resin (Y) is preferably 0.1% by mole or more, and more preferably 2% by mole or more and preferably 7% by mole or less. When the acetylation degree of the polyvinyl acetal resin (Y) is the above upper limit or less, it is possible to increase the hydrophobicity of the protective layer, and it is possible to prevent whitening.

The content of the plasticizer in the protective layer, relative to 100 parts by weight of the polyvinyl acetal resin (Y) in the protective layer is preferably 20 parts by weight or more, more preferably 30 parts by weight or more, and further preferably 35 parts by weight or more and is preferably 45 parts by weight or less, and more preferably 43 parts by weight or less. When the content of the plasticizer is the above lower limit or more, penetration resistance can be ensured, and when the content of the plasticizer is the above upper limit or less, it is possible to prevent the plasticizer from bleeding out, and to prevent deterioration in transparency and adhesivity of the multilayer film.

Since the sound insulating property of the glass plate-including laminate is further improved, the content of the hydroxyl group of the polyvinyl acetal resin (Y) is preferably larger, more preferably larger by 1% by mole or more, further preferably larger by 5% by mole or more, and especially preferably larger by 8% by mole or more than the content of the hydroxyl group of the polyvinyl acetal resin (X). By adjusting the contents of the hydroxyl group of the polyvinyl acetal resin (X) and the polyvinyl acetal resin (Y), it is possible to control the content of the plasticizer in the sound insulating layer and the protective layer, and the glass transition temperature of the sound insulating layer lowers. As a result, the sound insulating property of the glass plate-including laminate further improves.

Since the sound insulating property of the glass plate-including laminate further improves, the content of the plasticizer in the sound insulating layer (hereinafter, also referred to as content (X)) relative to 100 parts by weight of the polyvinyl acetal resin (X) in the sound insulating layer is preferably larger, more preferably larger by 5 parts by weight or more, further preferably larger by 15 parts by weight or more, and especially preferably larger by 20 parts by weight or more than the content of the plasticizer in the protective layer (hereinafter, also referred to as content (Y)) relative to 100 parts by weight of the polyvinyl acetal resin (Y) in the protective layer. By adjusting the content (X) and the content (Y), the glass transition temperature of the sound insulating layer lowers. As a result, the sound insulating property of the glass plate-including laminate further improves.

The thickness of the protective layer can be adjusted within such a range that the protective layer plays its part, and is not particularly limited. When there are projections and depressions on the protective layer, it is preferred that the thickness of the protective layer be made as thick as possible so as to suppress the transfer of the projections and depressions to the interface with the directly contacting sound insulating layer. Specifically, the thickness of the protective layer is preferably 100 μm or more, more preferably 300 μm or more, further preferably 400 μm or more, and especially preferably 450 μm or more. While the thickness of the protective layer is not particularly limited, the thickness is actually about 500 μm or less so as to ensure the thickness of the sound insulating layer to such a degree that sufficient sound insulating property is achieved. The thickness of the protective layer shows an average thickness. A cross section shape in the thickness direction of the protective layer may be a rectangular shape, and the protective layer may have a wedge-shaped portion.

The protective layer has one end, and other end on the opposite side of the one end, and may have such a shape that the thickness of the other end is larger than the thickness of the one end. It is preferred that the protective layer have a portion having a wedge-shaped cross section in the thickness direction. The minimum thickness of the protective layer can be adjusted within such a range that the protective layer plays its part, and is not particularly limited. When there are projections and depressions on the protective layer, it is preferred that the minimum thickness of the protective layer be made as thick as possible so as to suppress the transfer of the projections and depressions to the interface with the directly contacting sound insulating layer. Specifically, the minimum thickness of the protective layer is preferably 100 μm or more, more preferably 300 μm or more, further preferably 400 μm or more, and especially preferably 450 μm or more. The upper limit of the maximum thickness of the protective layer is not particularly limited. In order to ensure the thickness of the protective layer to such a degree that sufficient sound insulating property is achieved, the maximum thickness of the protective layer is preferably 1000 μm or less, and more preferably 800 μm or less.

The thermoplastic resin film according to the present invention may have one end and the other end being at the opposite side of the one end. The one end and the other end are end parts of both sides facing each other in the resin film. In the interlayer film for laminated glass of the present invention, it is preferred that the thickness of the other end be larger than the thickness of the one end because when the thermoplastic resin film is used as an interlayer film for laminated glass, the obtained laminated glass can be favorably used as a head-up display. The thermoplastic resin film of the present invention may have a wedge-shaped cross section. The film including the thermoplastic resin film of the present invention may have a wedge-shaped cross section. If the thermoplastic resin film has a wedge-shaped cross section, it is possible to display an image in a head-up display while preventing occurrence of double images by adjusting the wedge angle θ of the wedge shape in accordance with the attachment angle of laminated glass when the thermoplastic resin film is used as an interlayer film for laminated glass. From the viewpoint of further suppressing double images, the wedge angle θ is preferably 0.1 mrad or more, more preferably 0.2 mrad or more, and further preferably 0.3 mrad or more and is preferably 1 mrad or less, and more preferably 0.9 mrad or less. For example, when a thermoplastic resin film having a wedge-shaped cross section is produced by a method of extrusion molding a resin composition with an extruder, the shape of the resin film or the multilayer film can be such a shape having a minimum thickness in a region slightly inside from one end part of the thinner side (specifically, the region at a distance of 0X to 0.2X toward inside from one end of the thinner side when the distance between the one end and the other end is X) and having a maximum thickness in a region slightly inside from one end part of the thicker side (specifically, the region at a distance of 0X to 0.2X toward inside from one end of the thicker side when the distance between the one end and the other end is X). In the present specification, such a shape is also included in the wedge shape.

When the thermoplastic resin film of the present invention has a wedge-shaped cross section, a multilayer film including a sound insulating layer and a protective layer can be prepared by using the thermoplastic resin film. By laminating the protective layer while making the thickness of the sound insulating layer lie within a certain range, it is possible to adjust the cross section of the whole multilayer film to be a wedge shape having a certain wedge angle.

Examples of the lamination glass member include a glass plate, a PET (polyethylene terephthalate) film, and the like. As the laminated glass, laminated glass in which a resin film is sandwiched between a glass plate and a PET film or the like, as well as laminated glass in which a resin film is sandwiched between two glass plates, is included. The laminated glass is a laminate provided with a glass plate, and it is preferred that at least one glass plate be used. It is preferred that the second lamination glass member be a glass plate or a PET film.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth) acrylate plate, and the like.

The thickness of the lamination glass member is preferably 1 mm or more and preferably 5 mm or less, and more preferably 3 mm or less. The thickness of the glass plate is preferably 1 mm or more and preferably 5 mm or less, and more preferably 3 mm or less. When the lamination glass member is a PET film, the thickness of the PET film is preferably 0.03 mm or more and preferably 0.5 mm or less.

The method for producing the glass plate-including laminate is not particularly limited. By bonding the resin film with the first glass plate, it is possible to obtain a glass plate-including laminate. Furthermore, for example, the resin film is sandwiched between the first lamination glass member and the second lamination glass member, and then, passed through pressure rolls or subjected to decompression suction in a rubber bag, so that the air remaining between the first lamination glass member and the resin film, and between the second lamination glass member and the resin film is removed. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass which is a glass plate-including laminate can be obtained.

Each of the resin film and the glass plate-including laminate can be used for automobiles, railway vehicles, aircraft, ships, buildings and the like. Each of the resin film and the glass plate-including laminate can also be used for applications other than these applications. It is preferred that the resin film and the glass plate-including laminate be a resin film and a glass plate-including laminate for vehicles or for building respectively, and it is more preferred that the resin film and the glass plate-including laminate be a resin film and a glass plate-including laminate for vehicles respectively. Each of the resin film and the glass plate-including laminate can be used for a windshield, side glass, rear glass or roof glass of an automobile, and the like.

Hereinafter, the present invention will be described in more detail with reference to examples. The present invention is not limited only to these examples.

The following materials were used in examples and comparative examples.

(Thermoplastic Resin)

Polyvinyl butyral resin (PVB(1))(the polymerization degree of polyvinyl alcohol of 1700, the content of the hydroxyl group of 30% by mole, the acetylation degree of 1% by mole, the acetalization degree (the butyralization degree) of 69% by mole))

Polyvinyl butyral resin (PVB(2))(the polymerization degree of polyvinyl alcohol of 2300, the content of the hydroxyl group of 23.3% by mole, the acetylation degree of 12.5% by mole, the acetalization degree (the butyralization degree) of 64.2% by mole))

With regard to the polyvinyl butyral resin (PVB), the butyralization degree (the acetalization degree), the acetylation degree and the content of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

(Plasticizer)

Triethylene glycol di-2-ethylhexanoate (3GO)

(Compound Represented by Formula (1)) Compound represented by the formula (1AAA), provided that X before compounding is a hydrogen atom (Compound 1AAA)(Synthetic compound)

Compound represented by the formula (1ABA), provided that X before compounding is a hydrogen atom (Compound 1ABA)(Synthetic compound)

Compound represented by the formula (1ACA), provided that X before compounding is a hydrogen atom (Compound 1ACA)(Synthetic compound)

(Metal Salt)

Magnesium acetate (Mg acetate)

Magnesium 2-ethylhexanoate (Mg-2-ethylhexanoate)

Potassium acetate (K acetate)

(Oxidation Inhibitor)

BHT (2,6-di-t-butyl-p-cresol)

IRGANOX 1010 (Oxidation inhibitor containing a phenol skeleton available from BASF)

IRGANOX 1076 (Oxidation inhibitor containing a phenol skeleton available from BASF)

IRGANOX 245 (Oxidation inhibitor containing a phenol skeleton available from BASF)

ADK STAB AO-40 (Oxidation inhibitor containing a phenol skeleton available from ADEKA)

(Light Stabilizer)

Tinuvin765 (available from BASF)

TinuvinXT-850FF (available from BASF)

Example 1

Preparation of Resin Film:

To 100 parts by weight of PVB (1), 40 parts by weight of 3GO, Compound 1ABA in such an amount that is to be 0.011% by weight in the resultant resin film, Mg acetate in such an amount that Mg derived from Mg acetate in the resultant resin film is 25 ppm, Mg-2-ethylhexanoate in such an amount that Mg derived from Mg-2-ethylhexanoate in the resultant resin film is 25 ppm, and BHT in such an amount that is to be 0.15% by weight in the resultant resin film were added, and kneaded sufficiently with a mixing roll, to obtain a composition.

The obtained composition was extruded with an extruder to obtain a monolayer resin film (average thickness 760 μm).

Preparation of Laminated Glass:

The obtained resin film was cut out into a piece of 110 cm long×110 cm wide. Then the resin film was sandwiched between two sheets of clear glass (110 cm long×110 cm wide×2.5 mm thick), and vacuum-pressed by retention at 90° C. for 30 minutes with a vacuum laminator, to obtain laminated glass.

Examples 2 to 18 and Comparative Examples 1 to 4

A resin film and laminated glass were obtained in the same manner as that in Example 1 except that the kinds and the amounts of the ingredients of the composition were set to that shown in the following Tables 1 to 3. In Comparative Example 3, as a phenol compound other than those represented by the formula (1), IRGANOX 1010 (Oxidation inhibitor containing a phenol skeleton available from BASF) was used. In Comparative Example 4, as a phenol compound other than those represented by the formula (1), IRGANOX 245 (Oxidation inhibitor containing a phenol skeleton available from BASF) was used.

Example 19

Preparation of Composition for Forming Second Layer:

To 100 parts by weight of PVB (2), 60 parts by weight of 3GO was added, and kneaded sufficiently with a mixing roll, to obtain a composition.

Preparation of composition for forming first layer and third layer:

To 100 parts by weight of PVB (1), 40 parts by weight of 3GO, Mg acetate in such an amount that Mg derived from Mg acetate in the resultant first layer and third layer is 25 ppm, Mg-2-ethylhexanoate in such an amount that Mg derived from Mg-2-ethylhexanoate in the resultant first layer and third layer is 25 ppm, BHT in such an amount that is to be 0.15% by weight in the resultant first layer and third layer, and Tinuvin765 in such an amount that is to be 0.02% by weight in the resultant first layer and third layer were added, and kneaded sufficiently with a mixing roll, to obtain a composition for forming the first layer and the third layer.

Preparation of Multilayer Film:

The composition for forming the second layer, and the composition for forming the first layer and the third layer were coextruded by using a co-extruder. A multilayer film (800 μm thick) having a laminate structure of the first layer (350 μm thick)/the second layer (100 μm thick)/the third layer (350 μm thick) was prepared. In Example 19, each of the first layer and the third layer is a thermoplastic resin film containing a compound represented by the formula (1).

Comparative Examples 5 and 6

A multilayer film and laminated glass were obtained in the same manner as that in Example 19 except that the kinds and the amounts of the ingredients of the composition were set to that shown in the following Table 4. In Comparative Example 5, as a phenol compound other than those represented by the formula (1), IRGANOX 1010 (Oxidation inhibitor containing a phenol skeleton available from BASF) was used. In Comparative Example 6, as a phenol compound other than those represented by the formula (1), IRGANOX 245 (Oxidation inhibitor containing a phenol skeleton available from BASF) was used.

(Evaluation)

(1) Adhesive Force

By shattering the obtained laminated glass with a hammer, adhesive force of the glass was evaluated. The details are as follows.

Laminated glass was stood still at a temperature of 24° C.±1° C. for 16 hours to be conditioned. The conditioned laminated glass was hit with a hammer with a head part of 0.45 kg, and crushed until the grain diameter of the glass was 6 mm or less. Subsequently, adhesive force of the glass was determined by visual check. If the peeled area is less than 5%, the adhesive force is too high and the penetration resistance deteriorates, so that the laminated glass is likely to break as if it were torn. It was also confirmed that when the result of the adhesive force is "○○", the adhesive force is not too low, and the laminated glass tends to break in a cobweb-like manner rather than breaking as if it were torn.

[Criteria for judgment in adhesive force]

○○: Peeled area is 50% or more and less than 90%

○: Peeled area is 25% or more and less than 50%

Δ: Peeled area is 5% or more and less than 25% x: Peeled area is less than 5% or 90% or more (2) Discoloration Inhibiting Property (ΔYI)

A YI value (yellow degree, yellow index) by the transmission method of the obtained laminated glass was measured by using a spectrophotometer ("U-4100" available from Hitachi High-Technologies Corporation) in accordance with JIS K7105.

An initial YI value in an end part of the laminated glass was measured. Then the laminated glass was heated at 100° C. for 4 weeks. After heating, a YI value after heating at the end part of the laminated glass was measured. The region for measurement of the YI value was the region spanning 10 mm from the end part toward the inside in the direction perpendicular to the end side including the end part. An absolute value of the difference between the initial YI value and the YI value after heating was determined as ΔYI. Discoloration inhibiting property was determined from ΔYI by the following criteria.

[Criteria for Judgment in Discoloration Inhibiting Property]

○○: ΔYI is less than 1.5

○: ΔYI is 1.5 or more and less than 2.3

Δ: ΔYI is 2.3 or more and less than 3.4 x: ΔYI is 3.4 or more

The details and the results are shown in the following Tables 1 to 4.

TABLE 1

|  |  | Example 1 | Example 2 | Example 3 | Example 4 | Example 5 | Example 6 | Example 7 | Example 8 |
|---|---|---|---|---|---|---|---|---|---|
|  | Thermoplastic resin | PVB (1) | PVB (1) | PVB (1) | PVB (1) | PVB (1) | PVB (1) | PVB (1) | PVB (1) |
| Plasticizer | Kind | 3GO | 3GO | 3GO | 3GO | 3GO | 3GO | 3GO | 3GO |
|  | Content (parts by weight) | 40 | 40 | 40 | 40 | 40 | 40 | 40 | 40 |
| Metal salt | Kind | Mg acetate | Mg acetate | Mg acetate | Mg acetate | Mg acetate | Mg acetate | Mg acetate | Mg acetate |
|  | Content (ppm) | 25 | 25 | 25 | 25 | 25 | 25 | 25 | 30 |
|  | Kind | Mg-2-ethyl-hexanoate | Mg-2-ethyl-hexanoate | Mg-2-ethyl-hexanoate | Mg-2-ethyl-hexanoate | Mg-2-ethyl-hexanoate | Mg-2-ethyl-hexanoate | Mg-2-ethyl-hexanoate | Mg-2-ethyl-hexanoate |
|  | Content (ppm) | 25 | 25 | 25 | 25 | 25 | 25 | 25 | 30 |
| Compound represented by formula (1) | Kind | Compound 1ABA | Compound 1ABA | Compound 1ABA | Compound 1ABA | Compound 1AAA | Compound 1ACA | Compound 1ABA | Compound 1ABA |
|  | Content (% by weight) | 0.011 | 0.011 | 0.011 | 0.011 | 0.011 | 0.011 | 0.011 | 0.004 |
| Oxidation inhibitor | Kind | BHT | IRGANOX 1010 | IRGANOX 1076 | IRGANOX 245 | IRGANOX 245 | ADK STAB AO-40 | ADK STAB AO-40 | ADK STAB AO-40 |
|  | Content (% by weight) | 0.15 | 0.15 | 0.15 | 0.05 | 0.05 | 0.05 | 0.05 | 0.05 |
| Light stabilizer | Kind | — | — | — | — | — | — | — | — |
|  | Content (% by weight) | — | — | — | — | — | — | — | — |
|  | Adhesive force | ○ | ○ | ○ | ○ | ○ | ○ | ○ | ○ |
|  | Discoloration inhibiting property (ΔYI) | ○ | ○ | ○ | ○ | ○ | ○ | ○ | ○ |

TABLE 2

|  |  | Example 9 | Example 10 | Example 11 | Example 12 | Example 13 | Example 14 | Example 15 | Example 16 |
|---|---|---|---|---|---|---|---|---|---|
|  | Thermoplastic resin | PVB(1) | PVB(1) | PVB(1) | PVB(1) | PVB(1) | PVB(1) | PVB(1) | PVB(1) |
| Plasticizer | Kind | 3GO | 3GO | 3GO | 3GO | 3GO | 3GO | 3GO | 3GO |
|  | Content (parts by weight) | 40 | 40 | 40 | 40 | 40 | 40 | 40 | 40 |
| Metal salt | Kind | Mg acetate | Mg acetate | Mg acetate | Mg acetate | Mg acetate | Mg acetate | Mg acetate | K acetate |
|  | Content (ppm) | 30 | 30 | 20 | 30 | 30 | 30 | 60 | 60 |
|  | Kind | Mg-2-ethyl-hexanoate | Mg-2-ethyl-hexanoate | Mg-2-ethyl-hexanoate | Mg-2-ethyl-hexanoate | Mg-2-ethyl-hexanoate | Mg-2-ethyl-hexanoate | — | — |
|  | Content (ppm) | 30 | 30 | 40 | 30 | 30 | 30 | — | — |
| Compound represented by formula (1) | Kind | Compound 1ABA | Compound 1ABA | Compound 1ABA | Compound 1AAA | Compound 1AAA | Compound 1AAA | Compound 1AAA | Compound 1AAA |
|  | Content (% by weight) | 0.018 | 0.011 | 0.011 | 0.011 | 0.011 | 0.011 | 0.011 | 0.011 |
| Oxidation inhibitor | Kind | IRGANOX 1010 | IRGANOX 1010 | IRGANOX 1076 | IRGANOX 245 | IRGANOX 1010 | BHT | IRGANOX 245 | IRGANOX 245 |
|  | Content (% by weight) | 0.15 | 0.15 | 0.15 | 0.05 | 0.15 | 0.015 | 0.05 | 0.05 |
| Light stabilizer | Kind | — | Tinuvin 765 | Tinuvin 765 | Tinuvin 765 | Tinuvin XT850FF | — | Tinuvin 765 | Tinuvin 765 |
|  | Content (% by weight) | — | 0.02 | 0.02 | 0.02 | 0.02 | — | 0.02 | 0.02 |
|  | Adhesive force | ○○ | ○ | ○ | ○ | ○ | ○ | ○ | ○ |
|  | Discoloration inhibiting property (ΔYI) | ○ | ○ | ○ | ○ | ○○ | ○ | ○ | ○ |

TABLE 3

|  |  | Example 17 | Example 18 | Comparative Example 1 | Comparative Example 2 | Comparative Example 3 | Comparative Example 4 |
|---|---|---|---|---|---|---|---|
|  | Thermoplastic resin | PVB(1) | PVB(1) | PVB(1) | PVB(1) | PVB(1) | PVB(1) |
| Plasticizer | Kind | 3GO | 3GO | 3GO | 3GO | 3GO | 3GO |
|  | Content (parts by weight) | 40 | 40 | 40 | 40 | 40 | 40 |
| Metal salt | Kind | Mg acetate | Mg acetate | Mg acetate | Mg acetate | Mg acetate | Mg acetate |
|  | Content (ppm) | 25 | 25 | 25 | 25 | 25 | 25 |
|  | Kind | Mg-2-ethyl-hexanoate | Mg-2-ethyl-hexanoate | Mg-2-ethyl-hexanoate | Mg-2-ethyl-hexanoate | Mg-2-ethyl-hexanoate | Mg-2-ethyl-hexanoate |

TABLE 3-continued

|  |  | Example 17 | Example 18 | Comparative Example 1 | Comparative Example 2 | Comparative Example 3 | Comparative Example 4 |
|---|---|---|---|---|---|---|---|
|  | Content (ppm) | 25 | 25 | 25 | 25 | 25 | 25 |
| Compound represented by formula (1) | Kind | Compound 1ABA | Compound 1ABA | — | — | — | — |
|  | Content (% by weight) | 0.011 | 0.0025 | — | — | — | — |
| Phenol compound other than those represented by formula (1) | Kind | — | — | — | — | IRGANOX 1010 | IRGANOX 245 |
|  | Content (% by weight) | — | — | — | — | 0.011 | 0.011 |
| Oxidation inhibitor | Kind | — | — | BHT | — | — | — |
|  | Content (% by weight) | — | — | 0.15 | — | — | — |
| Light stabilizer | Kind | — | — | Tinuvin 765 | — | — | — |
|  | Content (% by weight) | — | — | 0.02 | — | — | — |
| Adhesive force |  | ○ | ○ | x | x | x | x |
| Discoloration inhibiting property (ΔYI) |  | Δ | Δ | x | x | Δ | Δ |

TABLE 4

|  |  |  | Example 19 | Comparative Example 5 | Comparative Example 6 |
|---|---|---|---|---|---|
| First layer and third layer (Thermoplastic resin film) |  | Thermoplastic resin | PVB (1) | PVB (1) | PVB (1) |
|  | Plasticizer | Kind | 3GO | 3GO | 3GO |
|  |  | Content (parts by weight) | 40 | 40 | 40 |
|  | Metal salt | Kind | Mg acetate | Mg acetate | Mg acetate |
|  |  | Content (ppm) | 25 | 25 | 25 |
|  |  | Kind | Mg-2-ethylhexanoate | Mg-2-ethylhexanoate | Mg-2-ethylhexanoate |
|  |  | Content (ppm) | 25 | 25 | 25 |
|  | Compound represented by formula (1) | Kind | Compound 1ABA | — | — |
|  |  | Content (% by weight) | 0.011 | — | — |
|  | Phenol compound other than those represented by formula (1) | Kind | — | IRGANOX 1010 | IRGANOX 245 |
|  |  | Content (% by weight) | — | 0.011 | 0.011 |
|  | Oxidation inhibitor | Kind | BHT | BHT | BHT |
|  |  | Content (% by weight) | 0.15 | 0.15 | 0.15 |
|  | Light stabilizer | Kind | Tinuvin765 | Tinuvin765 | Tinuvin765 |
|  |  | Content (% by weight) | 0.02 | 0.02 | 0.02 |
| Second layer |  | Thermoplastic resin | PVB (2) | PVB (2) | PVB (2) |
|  | Plasticizer | Kind | 3GO | 3GO | 3GO |
|  |  | Content (parts by weight) | 60 | 60 | 60 |
| Whole multilayer film |  | Film configuration | First layer/second layer/third layer | First layer/second layer/third layer | First layer/second layer/third layer |
| Evaluation |  | Adhesive force | ○ | x | x |
|  |  | Discoloration inhibiting property (ΔYI) | ○ | ○ | ○ |

In Tables 1 to 3, the content of the plasticizer is a content relative to 100 parts by weight of the thermoplastic resin. The mixing amounts of the compound represented by the formula (1), the oxidation inhibitor, and the light stabilizer are contents in 100% by weight of the resin film. The content of the metal salt is the concentration in the resin film.

In Table 4, the content of the plasticizer is a content relative to 100 parts by weight of the thermoplastic resin. The mixing amounts of the compound represented by the formula (1), the oxidation inhibitor, and the light stabilizer are contents in 100% by weight of the first layer, the second layer or the third layer. The content of the metal salt is the concentration in the first layer, the second layer or the third layer.

Also in a resin film of each Example, it was confirmed that the discoloration inhibiting property is further enhanced when the ultraviolet ray screening agent is further mixed. Also in a resin film of each Example, it was confirmed that the discoloration inhibiting property is further enhanced when the light stabilizer is further mixed.

EXPLANATION OF SYMBOLS

1: Glass plate-including laminate (Laminated glass)
2: Resin film
2a: First surface
2b: Second surface
11: Glass plate-including laminate (Laminated glass)
12: Resin film
13: First layer (Resin film)
14: Second layer (Resin film)
15: Third layer (Resin film)
13a: Outer surface
15a: Outer surface
21: First lamination glass member (First glass plate)
22: Second lamination glass member

The invention claimed is:
1. A thermoplastic resin film comprising:
a thermoplastic resin; and
a compound represented by a formula (1) below:

[Chemical 1]

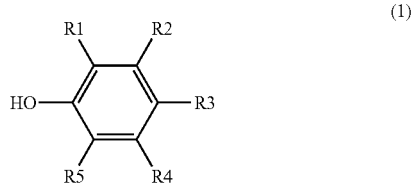

(1)

wherein, R1, R2, R3, R4 and R5 each represent a hydrogen atom, an alkyl group, a carboxyalkyl group, a group that is a salt of a carboxyalkyl group and alkali metal, or a group that is a salt of a carboxyalkyl group and alkaline earth metal, and at least one of R1, R2, R3, R4 and R5 represents a group that is a salt of a carboxyalkyl group and alkali metal, or a group that is a salt of a carboxyalkyl group and alkaline earth metal.

2. The thermoplastic resin film according to claim 1, wherein R1, R2, R4 and R5 each represents a hydrogen atom or an alkyl group, and R3 represents a group that is a salt of a carboxyalkyl group and alkali metal, or a group that is a salt of a carboxyalkyl group and alkaline earth metal.

3. The thermoplastic resin film according to claim 2, wherein the compound represented by the formula (1) includes a compound represented by a formula (1A) below:

[Chemical 2]

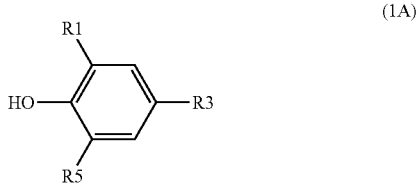

(1A)

wherein, R1 and R5 each represent a hydrogen atom or an alkyl group, and R3 represents a group that is a salt of a carboxyalkyl group and alkali metal, or a group that is a salt of a carboxyalkyl group and alkaline earth metal.

4. The thermoplastic resin film according to claim 2, wherein R3 represents a group that is a salt of a carboxyalkyl group with 3 or less carbon atoms and alkali metal, or a group that is a salt of a carboxyalkyl group with 3 or less carbon atoms and alkaline earth metal.

5. The thermoplastic resin film according to claim 1, wherein the thermoplastic resin is a polyvinyl acetal resin.

6. The thermoplastic resin film according to claim 1, further comprising a plasticizer.

7. The thermoplastic resin film according to claim 1, further comprising K and Mg in a total amount of 250 ppm or less.

8. The thermoplastic resin film according to claim 1, further comprising a light stabilizer.

9. The thermoplastic resin film according to claim 1, further comprising an oxidation inhibitor.

10. The thelinoplastic resin film according to claim 1, wherein a content of the compound represented by the formula (1) in 100% by weight of the thermoplastic resin film is 0.001% by weight or more.

11. The thermoplastic resin film according to claim 1, which is to be used while being bonded to a glass plate.

12. A glass plate-including laminate comprising:
a first glass plate; and
a film including the thermoplastic resin film according to claim 1,
the thermoplastic resin film being bonded to the first glass plate.

13. The glass plate-including laminate according to claim 12, comprising:
the first glass plate as a first lamination glass member;
a film including the thermoplastic resin film; and
a second lamination glass member,
wherein
the thermoplastic resin film is bonded to the first glass plate,
the film including the thermoplastic resin film is bonded to the second lamination glass member, and
the film including the thermoplastic resin film is arranged between the first glass plate and the second lamination glass member.

* * * * *